(12) United States Patent
Ninassi et al.

(10) Patent No.: US 8,189,911 B2
(45) Date of Patent: May 29, 2012

(54) METHOD FOR ASSESSING IMAGE QUALITY

(75) Inventors: Alexandre Ninassi, Osse (FR); Olivier Le Meur, Talensac (FR); Patrick Le Callet, Le Pallet (FR); Dominique Barba, Carquefou (FR)

(73) Assignee: Thomson Licensing, Issy les Moulineaux (FR)

( * ) Notice: Subject to any disclaimer, the term of this patent is extended or adjusted under 35 U.S.C. 154(b) by 162 days.

(21) Appl. No.: 12/735,310

(22) PCT Filed: Dec. 19, 2008

(86) PCT No.: PCT/EP2008/068067
§ 371 (c)(1),
(2), (4) Date: Jul. 1, 2010

(87) PCT Pub. No.: WO2009/087051
PCT Pub. Date: Jul. 16, 2009

(65) Prior Publication Data
US 2010/0284624 A1 Nov. 11, 2010

(30) Foreign Application Priority Data
Jan. 4, 2008 (EP) .................................... 08300006

(51) Int. Cl.
*G06K 9/34* (2006.01)
(52) U.S. Cl. ........ 382/167; 382/224; 382/240; 382/190; 382/233; 375/E7.069; 375/E7.162; 375/E7.182
(58) Field of Classification Search .................. 382/167, 382/224, 240, 248, 232, 190, 233, 244, 238, 382/251; 375/E7.069, E7.162, E7.182
See application file for complete search history.

(56) References Cited

U.S. PATENT DOCUMENTS

| 7,639,886 | B1 * | 12/2009 | Rastogi | 382/251 |
| 2003/0179933 | A1 * | 9/2003 | Kato et al. | 382/190 |
| 2007/0053431 | A1 * | 3/2007 | Cammas et al. | 375/240.12 |
| 2007/0263938 | A1 * | 11/2007 | Lee et al. | 382/240 |

(Continued)

FOREIGN PATENT DOCUMENTS
WO  WO2007097580  8/2007

OTHER PUBLICATIONS

Chandler et al., "VSNR: A Wavelet-Based Visual Signal-to-Noise Ratio for Natural Images", IEEE Transactioins on Image Processing, vol. 16, No. 9, pp. 2284-2298, Sep. 1, 2007.

(Continued)

*Primary Examiner* — Brian Q Le
*Assistant Examiner* — Mekonen Bekele
(74) *Attorney, Agent, or Firm* — Robert D Shedd; Harvey D. Fried; Richard LaPeruta

(57) ABSTRACT

A method for assessing image quality between a reference image and an impaired image is disclosed. The method comprises the steps of
  subband decomposition of the luminance component of the reference image into N subbands, called reference subbands and of the luminance component of the impaired image into N subbands, called impaired subbands; errors computation from the reference subbands and from the impaired subbands; and
  pooling the computed the errors.
The subband decomposition is based on a wavelet transform adapted to decompose each of the luminance components into L levels of decomposition, with L a positive integer determined as a function of the image height and of the distance of visualization.

8 Claims, 3 Drawing Sheets

U.S. PATENT DOCUMENTS

2009/0103813 A1* 4/2009 Le Meur et al. ............. 382/199
2009/0232408 A1* 9/2009 Meany ......................... 382/246

OTHER PUBLICATIONS

Bradley, "A Wavelet Visible Difference Predictor", IEEE Transactions of Image Processing, vol. 8, No. 5, pp. 717-730, May 1, 1999.

Wang et al., "Wavelet-Based Foveated Image Quality Measurement for Region of Interest Image Coding", Proceedings 2001 International Conference on Image Processing, vol. Conf. 8, pp. 89-92, Oct. 7, 2001.

Le Callet et al., "Robust Approach for Color Image Quality Assessment", Proceedings of SPIE Conference, vol. 5150, pp. 1573-1581, 2003.

Saadane, "Toward a Unified Fidelity Metric of Still-Coded Images", Journal of Electronic Imaging, vol. 16, No. 1, Mar. 2007.

Pappas et al., "Perceptual Criteria for Image Quality Evaluation", Handbook of Image and Video Processing—pp. 939-959, Jan. 1, 2005.

Toet et al., "A New Universal Colour Image Fidelity Metric", Displays Devices, vol. 24, No. 4-5, pp. 197-207, Dec. 1, 2003.

Daly, "The Visible Differences Predictor: An Algorithm for the Assessment of Image Fidelity", Proceedings of the SPIE, vol. 1666, pp. 2-15, Jan. 1, 1992.

Search Report dated Mar. 9, 2010.

* cited by examiner

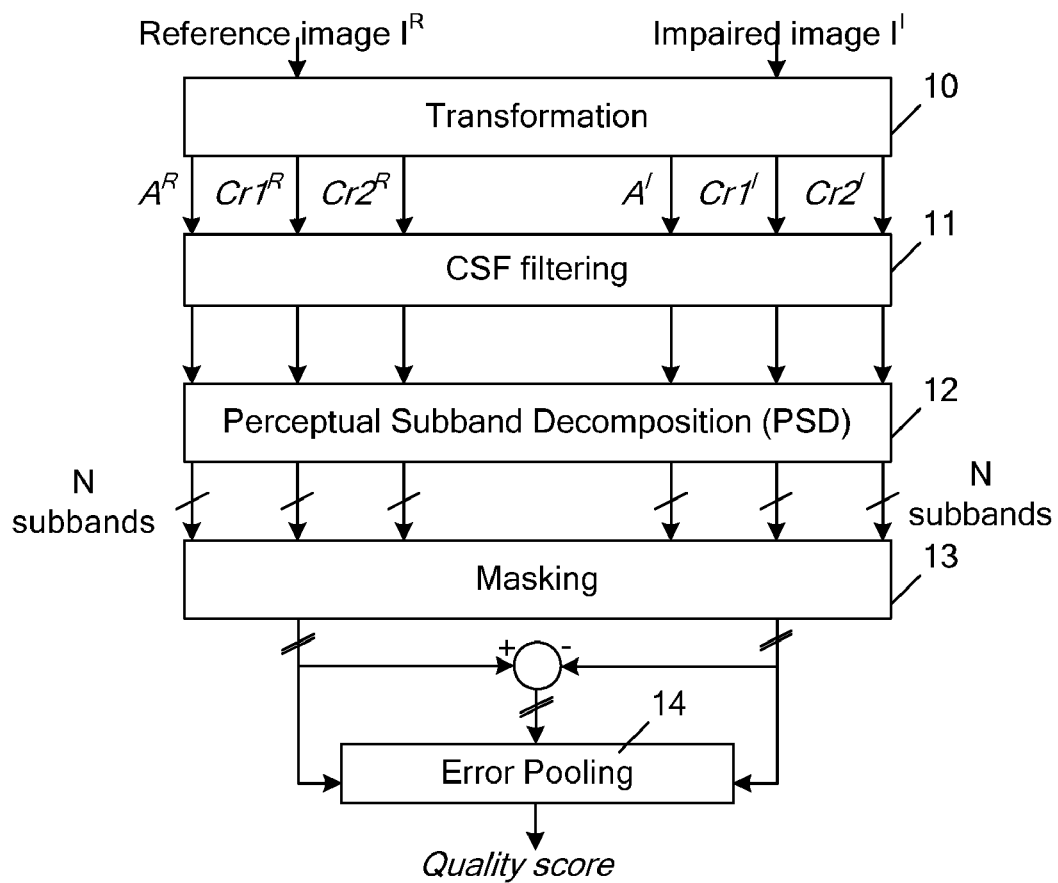
FIG. 1- STATE OF THE ART
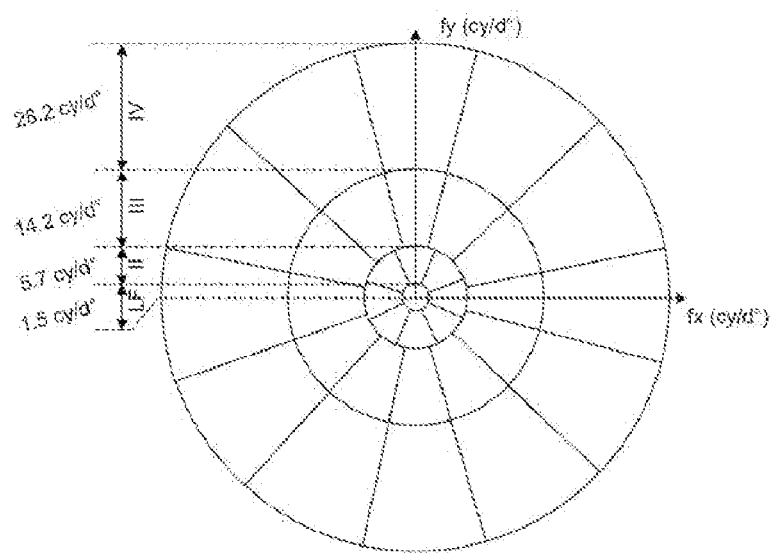
FIG. 2- STATE OF THE ART

METHOD FOR ASSESSING IMAGE QUALITY

This application claims the benefit, under 35 U.S.C. §365 of International Application PCT/EP2008/068067, filed Dec. 19, 2008, which was published in accordance with PCT Article 21(2) on Jul. 16, 2009 in English and which claims the benefit of European patent application No. 08300006.7, filed Jan. 4, 2008.

FIELD OF THE INVENTION

The present invention relates to a method for assessing image quality between a reference image and an impaired image.

BACKGROUND OF THE INVENTION

Objective methods for assessing perceptual image quality commonly examine the visibility of the errors. An error is the difference between an impaired image and a reference image. Both images are made up of pixels. Each pixel is associated with three color values also called color components for example RGB or YUV. Bearing in mind a variety of known properties of the human visual system, an objective quality metric is able to give a relevant quality value regarding a ground truth. Classical methods used to assess the quality of an impaired image with respect to a reference image such as the one described in the document from Le Callet et al. entitled "*A robust quality metric for color image quality assessment*" published in ICIP2003 comprise the following steps depicted on FIG. 1:

A transformation step 10;
A contrast sensitivity function (CSF) filtering step 11;
A perceptual subband decomposition (PSD) step 12;
A masking step 13; and
An error pooling step 14.

The transformation step 10 consists in transforming each of the three color components of both the reference and the impaired images into a perceptual color space, for example the Krauskopf color space (A, Cr1, Cr2) which is more relevant from the human visual system point of view. The transformation step 10 simulates the color opponent process. The opponent color theory suggests that there are three opponent channels: red versus green (channel Cr1), blue versus yellow (channel Cr2), and black versus white (channel A). The latter channel is achromatic and detects light-dark variation, or luminance.

The filtering step 11 consists in filtering the three components of both the impaired and the reference images using the CSF function. CSF deals with the fact that a viewer is not able to perceive all the details in his visual field with the same accuracy. More precisely, the viewer sensitivity depends of the spatial frequencies and the orientation of visual stimuli. For examples, if the frequency of the visual stimuli is too high, a viewer is not able to recognize the stimuli pattern anymore. Moreover his sensitivity is higher for the horizontal and vertical structures.

The perceptual subband decomposition step 12 consists in decomposing each of the three filtered components of both the impaired and the reference images into N subbands in the Fourier domain. The perceptual subband decomposition step 12 simulates the different populations of visual cells (cones, . . . ). Therefore, each subband may be regarded as the neural image generated by a particular population of visual cells tuned to both a particular orientation and a particular frequency. The decomposition, based on different psychophysics experiments, is obtained by carving up the frequency domain both in spatial radial frequency and orientation. The perceptual decomposition of one luminance component leads to 17 psychovisual subbands distributed on 4 crowns as shown on FIG. 1. Four crowns of spatial frequency are labelled from I to IV on FIG. 1:

I: spatial frequencies from 0 to 1.5 cycles per degree;
II: spatial frequencies from 1.5 to 5.7 cycles per degree;
III: spatial frequencies from 5.7 to 14.2 cycles per degree;
IV: spatial frequencies from 14.2 to 28.2 cycles per degree.

The masking step 13 deals with the modulation of the sensitivity of the eyes regarding the content of the image. It takes into account the fact that a coding artefact is more visible in a flat region (featured by a weak masking capability) than in a highly textured region (featured by a strong masking capability).

The error pooling step 14 combines the error signals coming from different modalities into a single quality score.

The perceptual subband decomposition step 12 is achieved in the Fourier domain. Such PSD is depicted on FIG. 2. This decomposition is known from the document from Senane et al entitled "*The computation of visual bandwidths and their impact in image decomposition and coding*" published in 1993 in the International Conference and signal Processing Applications and Technology.

Since most images have a resolution that is not a power of two, the time required for applying the Fourier transform and to perform the subband decomposition is high.

SUMMARY OF THE INVENTION

The object of the invention is to alleviate this disadvantage of the prior art. The invention relates to a method for assessing image quality between a reference image and an impaired image, each image being associated with at least one luminance component. The method comprises the steps of:

subband decomposition of the luminance component of the reference image into N subbands, called reference subbands and of the luminance component of the impaired image into N subbands, called impaired subbands;
errors computation from the reference subbands and from the impaired subbands; and
pooling the computed the errors.

According to the invention the subband decomposition is based on a wavelet transform adapted to decompose each of the luminance components into L levels of decomposition, with L a positive integer determined as a function of the image height and of the distance of visualization. By using such a wavelet transform, the complexity of the method is decreased compared to the state of art method. Besides, the method of the invention remains accurate from the human visual system point of view since the number of levels of decomposition is made dependant of both the image height and of the distance of visualization.

According to a specific embodiment of the invention, each image being further associated with two chrominance components, the subband decomposition step is preceded by a transformation step for transforming the luminance component and the two chrominance components of a given image into a new luminance component and two new chrominance components lying in an opponent color space.

According to another specific embodiment of the invention, the subband decomposition step is followed by a contrast sensitivity function filtering step for filtering the N reference subbands and the N impaired subbands.

According to another aspect of the invention, the contrast sensitivity function filtering step is followed by a masking step of the filtered subbands into normalized subbands.

Advantageously, L is determined as the lowest positive integer that verifies the following inequality:

$$\frac{F_{max}}{2^L} < Th, \text{ where } F_{max} = \tan\left(\frac{1}{2}\right) \times \frac{d}{H} \times H_{pixel},$$

H is the image height in meters, $H_{pixel}$ is the image height in pixel, d is the distance of visualization in meters and Th is a predefined threshold.

According to an exemplary embodiment Th=1.5.

According to another specific aspect of the invention, the masking step comprises the following steps:

computing, for each coefficient of each filtered subband one visibility threshold elevation with respect to the reference image and one visibility threshold elevation with respect to the impaired image, each of the visibility threshold elevation depending on a local complexity parameter.

computing, for the impaired image and the reference image, the coefficients of the normalized subband as the corresponding coefficient of the filtered subbands divided by the maximum value between the visibility threshold elevation of the coefficient relating to the reference image and the visibility threshold elevation of the coefficient relating to the impaired image The visibility threshold elevation with respect to a given image is for example computed for a coefficient of coordinates m and n in a subband of decomposition level l and direction d as follows:

$$T_{l,d}(m,n) = \left(1 + (k_1 \times (k_2 \times |\tilde{c}_{l,d}(m,n)|)^{S+\Delta s(m,n)})^b\right)^{\frac{1}{b}}$$

where:
  $k_1$=0.0153
  $k_2$=392.5
  $S+\Delta s(m,n)\epsilon[0.6;1]$
  $\Delta s(m,n)$ is the local complexity parameter, $\Delta s(m,n)\epsilon[0;1-S]$
Subband dependant:
  $b\epsilon[2;4]; S\epsilon[0.6;0.8]$ According to another aspect of the invention, the subband decomposition step is preceded by a filtering step for filtering the luminance component of the reference image and the luminance component of the impaired image according to a non linear function.

BRIEF DESCRIPTION OF DRAWINGS

Other features and advantages of the invention will appear with the following description of some of its embodiments, this description being made in connection with the drawings in which:

FIG. 1 depicts a flowchart of a method for assessing image quality according to the state of the art;

FIG. 2 illustrates the perceptual subband decomposition in the Fourier domain according to the state of the art;

DETAIL DESCRIPTION OF PREFERRED EMBODIMENTS

Figure 3:
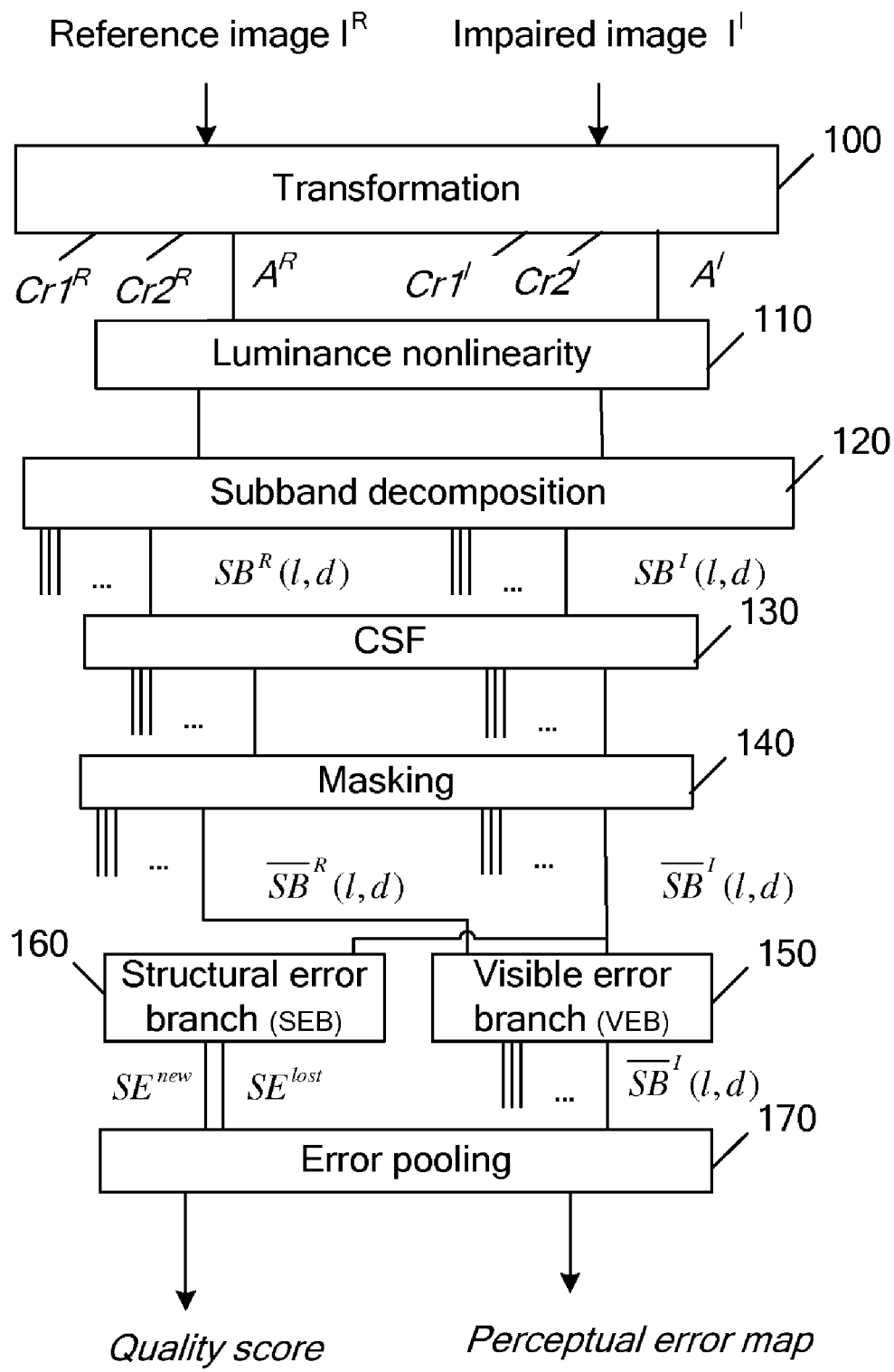
FIG. 3 depicts a flowchart of a method for assessing image quality according to the invention.

The present invention directs to a method for assessing image quality between a reference image $I^R$ and an impaired image $I^I$. Each image is made up of pixels. Each pixel is associated with three original color values such as RGB or YUV. FIG. 3 is a flowchart of the method according to the invention.

At step 100, the three original color components of both the reference image and the impaired image are transformed into three new color components. The three new color components lie in a perceptual color space such as the Krauskopf color space. In the human color vision, it is admitted that signals issued from three types of cones (L, M, S) are combined in two opponent color components and one achromatic component. Therefore, the opponent color space defined by Krauskopf in the document entitled "Cardinal directions of color space" and published in Vision Research in 1982 is used at step 100. The invention is not limited to the Krauskopf color space. Other appropriate color spaces may be used provided that they make use of the opponent color components theory. In this color space, the cardinal directions are A, Cr1 and Cr2 where A component corresponds to the luminance component while Cr1 and Cr2 components are chromatic components (red-green axis for Cr1, and yellow-blue axis for Cr2). Step 100 is the same as step 10 of the prior art method described with reference to FIG. 1. For sake of clarity, the invention is described for the luminance component A only but may also be applied to the chrominance components. In this case, the functions (i.e. PSD, CSF and masking functions) are adapted for the chrominance components. Furthermore, the non linearity function is not applied on the chrominance components.

At step 110, a non linearity function is applied to the luminance component A of both the reference image and the impaired image. This step makes it possible to improve the results of the whole system but is not essential for solving the technical problem mentioned above, i.e. decreasing the computation time. Therefore step 110 may be considered as optional. The luminance non linearity follows a power law function given by the following equation where B is Brightness/lightness estimated by the observer:

$B = a \cdot A^p - B_0$, where: $a$=19.8, $p$=⅓ and $B_0$=0

At step 120, a subband decomposition defined by wavelet filters is applied to the luminance component $A^R$ of the reference image and to the luminance component $A^I$ of the impaired image after the non linear filtering of step 110. The filters are defined such that they describe the different channels in the human vision system. This subband decomposition is based on a spatial frequency dependant wavelet transform and is defined to approximate the known perceptual subband decomposition referred as Fourier based PSD in the prior art which is itself defined by analytic filters. As an example, the 9/7 Cohen-Daubechies-Feauveau wavelet transform is used. According to the invention, for a given distance of visualization, the number L of decomposition levels of the discrete wavelet transform (DWT) is chosen so that the low frequency subband denoted LF of the DWT corresponds to the LF subband of the PSD, i.e. such that LF matches the lowest radial subband of the human visual system. Indeed, for a given distance d of visualization, the higher L is, the lower the spatial frequencies of the LF of the DWT are. In order to determine the number L of decomposition levels, the maximal spatial frequency $F_{max}$ of the image is first computed as follows:

$$F_{max} = \tan\left(\frac{1}{2}\right) \times \frac{d}{H} \times H_{pixel},$$

where H is the image height in meters, $H_{pixel}$ is the image height in pixel, and d is the distance of visualization in meters.

Then, the number L of decomposition levels is determined as the lowest positive integer L that verifies the following inequality:

$$\frac{F_{max}}{2^L} < Th,$$

where Th is in cy/d° and is a predefined threshold representing the highest frequency limit of the LF subband of the PSD as defined on FIG. 2. Preferentially, Th=1.5.

Figure 4:
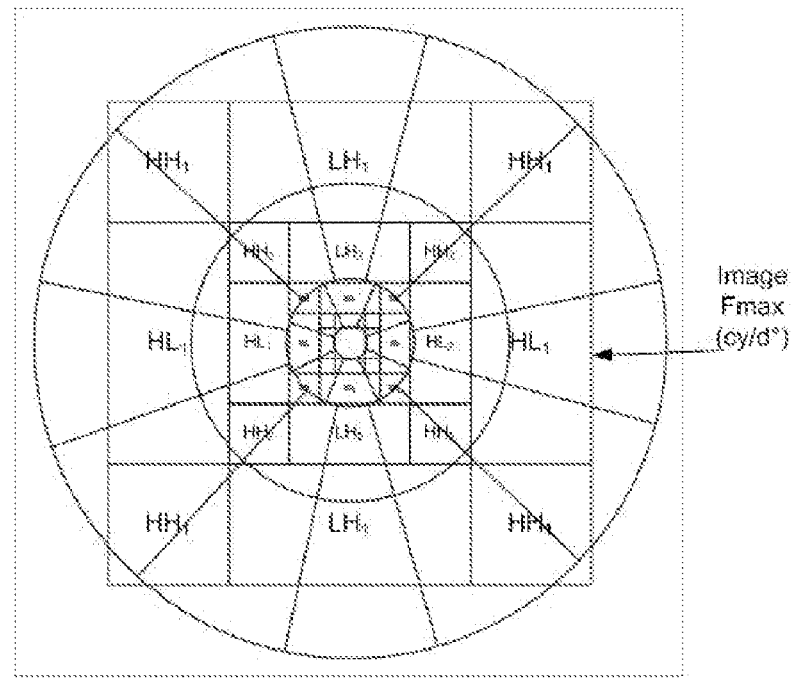
FIG. 4 illustrates a subband decomposition in the Wavelet domain according to the invention.

The wavelet based subband decomposition with L=4 is depicted on FIG. 4 with respect to the PSD. Therefore the luminance component $A^R$ of the reference image is decomposed into N subbands denoted $SB^R$ (l,d), where l is the decomposition level of the subband and d is its orientation within this decomposition level/∈[0;L] and d∈{LH,HL,HH}. Each subband is made up of wavelet coefficients denoted $c_{l,d}(m,n)$, where (m,n) are the coordinates within the subband of the wavelet coefficients. The same applies to the luminance component $A^I$ of the impaired image which is decomposed into N subbands denoted $SB^I$(l,d).

At step 130, a filtering step using the Contrast Sensibility Function (CSF) is advantageously applied on each subband provided at step 120. The Contrast Sensibility Function (CSF) describes the variations in visual sensitivity as a function of spatial frequency and orientation. As complete frequency representation of the images is not available, the CSF is applied over the DWT subbands. So the wavelet coefficients $\tilde{c}_{l,d}(m,n)$ are normalized by the CSF using one value by DWT subband:

$$\tilde{c}_{l,d}(m,n) = c_{l,d}(m,n) \cdot N_{l,d}^{CSF}$$

For each subband a CSF value $N_{l,d}^{CSF}$ is calculated from a 2D CSF. $N_{l,d}^{CSF}$ is the mean of the 2D CSF over the covered frequency range of the subband (l,d). Prior to its use, the 2D CSF is normalized by its maximum, so that $N_{l,d}^{CSF} \in [0;1]$. Such a 2D CSF is disclosed by Daly in the document entitled "The visible different predictor: an algorithm for the assessment of image fidelity" published in Proc. of SPIE, Vol. 1666, Human vision, visual processing and digital display III, in 1992. The 2D CSF of Daly is described as a function of radial frequency ω in cy/deg, orientation θ in degrees, light adaptation level l in cd/m², image size s in visual degrees², lens accommodation due to distance d in meters and eccentricity e in degrees by the following equations:

$$CSF(\omega, \theta, l, s, d, e) = P \cdot \min\left[csf\left(\frac{\omega}{b\omega_a \cdot b\omega_e \cdot b\omega_\theta}, l, s\right), csf(\omega, l, s)\right]$$

$$\begin{cases} b\omega_a = 0.856 \times d^{0.14} \\ b\omega_e = \frac{1}{1 + 0.24 \times e} \\ b\omega_\theta = 0.15 \times \cos(4\theta) + 0.85 \end{cases}$$

where $$csf(\omega, l, s) = \left((3.23 \times (\omega^2 \times s)^{-0.3})^{0.5} + 1\right)^{-1/5} \times$$

-continued $$A_l \times 0.9 \times \omega \times e^{-(B_l \times 0.9 \times \omega)} \times \sqrt{1 + 0.06 \times e^{B_l \times 0.9 \times \omega}}$$

with $\begin{cases} A_l = 0.801 \times (1 + 0.7/l)^{-0.2} \\ B_l = 0.3 \times (1 + 100/l)^{0.15} \end{cases}$ This step is the same as the step 11 of the prior art method.

At step 140, a masking step applies. Masking is a well known effect that refers to the changes of visibility increase (pedestal effect) or decrease (masking effect) of a signal due to the presence of background. Thanks to the subband decomposition, the visual masking step 140 makes it possible to model the visibility modification. Unlike the prior art method, the visual masking effect concerns here both contrast masking and entropy masking (or activity masking). The former is used to take in account the modification of the visibility threshold due to the contrast value, whereas the latter, i.e. the entropy masking, makes it possible to consider the modification of the visibility threshold due to the local neighborhood of an image. The masking effect is implemented using an adaptation of the Daly's model taking into account the modification of the visibility threshold due to the local neighborhood.

The visibility elevation threshold $T_{l,d}(m,n)$ of the site (m,n) in the subband is given by:

$$T_{l,d}(m, n) = \left(1 + (k_1 \times (k_2 \times |\tilde{c}_{l,d}(m, n)|)^{s(m,n)})^{b_{l,d}}\right)^{\frac{1}{b_{l,d}}}$$

where:

$k_1 = 0.0153$ $k_2 = 392.5$ $s(m,n) = S_{l,d} + \Delta s(m,n) \in [0.6;1]$

Subband dependant: $b_{l,d} \in [2;4]$; $S_{l,d} \in [0.6;0.8]$ $\Delta s(m,n)$: local complexity $\in [0;1-S]$ More precisely two visibility elevation thresholds $T_{l,d}(m,n)$ are computed one for the reference image denoted $T_{l,d}^R(m,n)$ and one for the impaired image denoted $T_{l,d}^I(m,n)$.

The local complexity parameter $\Delta s(m,n)$ is estimated from the luminance component A of either the reference image or the impaired image. First, a local entropy value (denoted $E_R(m,n)$ for the reference image and $E_I(m,n)$ for the impaired image) is calculated for each site (m,n) in a n-by-n neighborhood centered on site (m,n) for the component A. Therefrom, two entropy maps $E_R$ and $E_I$ are obtained corresponding to the reference image and to the impaired image respectively. Each entropy map is made up of the local entropy values $E_R(m,n)$ and $E_I(m,n)$ respectively. The entropy maps $E_R$ and $E_I$ are finally combined into a final entropy map E in order to discard the strong entropy values when the difference between them are important. The final entropy map E is made up of the final entropy value denoted E(m,n) derived from both values $E_R(m,n)$ and $E_I(m,n)$. E(m,n) is set equal to $E_I(m,n)$ if $E_I(m,n)$ and $E_R(m,n)$ are both greater then a predefined threshold $E_t$, and equal to null otherwise. The entropy threshold $E_t$ is empirically deduced (trial on various types of texture . . . ) and set to 1. Finally, $\Delta s(m,n)$ is calculated from E(m,n) through a sigmoid function to map the entropy values to the $\Delta s(m,n)$ values:

$$\Delta s(m, n) = \frac{b1}{1 + e^{-b2 \cdot (E(m,n) - b3)}}$$

where $b_1$, $b_2$, $b_3$ are empirically deduced (trial on various types of texture).

Finally, the masking normalization is applied on the CSF normalized wavelet coefficients $\tilde{c}_{l,d}(m,n)$ in each subband and for both reference image and the impaired image according to the following equations:

$$\begin{cases} \bar{c}^R_{l,d}(m, n) = \dfrac{\tilde{c}^R_{l,d}(m, n)}{\max(T^R_{l,d}(m, n), T^I_{l,d}(m, n))} \\ \bar{c}^I_{l,d}(m, n) = \dfrac{\tilde{c}^I_{l,d}(m, n)}{\max(T^R_{l,d}(m, n), T^I_{l,d}(m, n))} \end{cases}$$

At step 150, an inverse DWT (spatial synthesis) is applied individually on each normalized subband $\bar{c}_{l,d}^I$ made up of coefficients $\bar{c}_{l,d}^I(m,n)$ (the other subband values being set to 0) resulting in 3L+1 spatial representations $\overline{C}_{l,d}^I$ of the corresponding subband. The inverse DWT is the inverse transform of the transform applied at step 120. The same inverse DWT applies on the subbands of the reference image in order to generate a 3L+1 spatial representation $\overline{C}_{l,d}^R$ of the corresponding subband. Therefore, the visible errors $VE_{l,d}(m,n)$ are computed for each spatial representation according to the following equation:

$$VE_{l,d}(m,n) = |\overline{C}_{l,d}^R(m,n) - \overline{C}_{l,d}^I(m,n)|$$

At step 160, the inverse DWT is applied on the whole normalized subbands, resulting in one normalized representation of the reference image denoted $\overline{A}^R(m,n)$, and one normalized representation of the impaired image denoted $\overline{A}^I(m,n)$. Therefore, two maps representing the spatial location of the structural modifications are computed according to the following equations:

$$\begin{cases} SE^{new}(m, n) = binarisation(sobelFilter(\overline{A}^I(m, n)) - sobelFilter(\overline{A}^R(m, n))) \\ SE^{lost}(m, n) = binarisation(sobelFilter(\overline{A}^R(m, n)) - sobelFilter(\overline{A}^I(m, n))) \end{cases}$$

where sobelFilter is the well-known Sobel filtering. The map $SE^{new}(m,n)$ encodes the spatial locations of the structure appearing between the reference image and the impaired image (i.e. new edges). The map $SE^{lost}(m,n)$ encodes the spatial locations of the structure disappearing between the reference and the impaired image (i.e. lost edges). The binarization threshold is empirically adapted for the Sobel filtering of the normalized representations.

Figure 5:
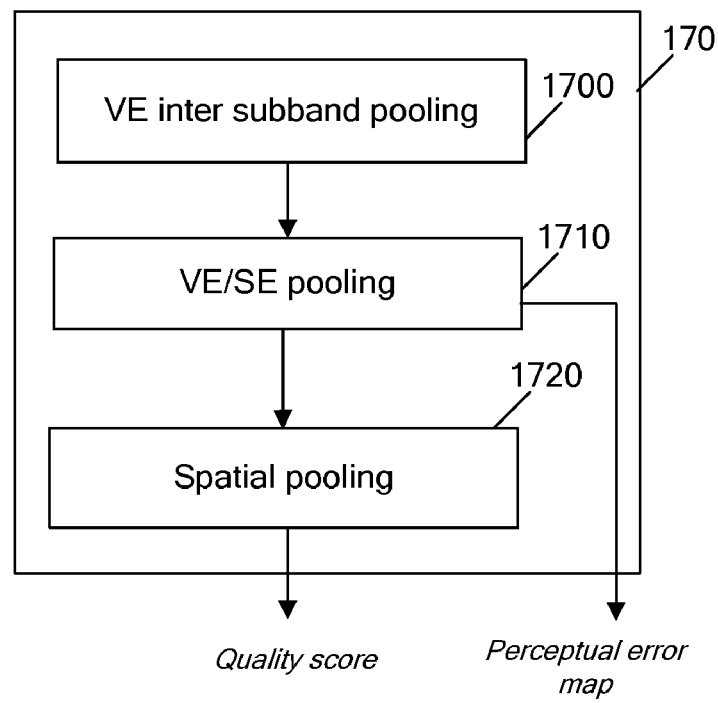
FIG. 5 depicts a flowchart of an error pooling step according to the invention.

At step 170, an error pooling step applies. The error pooling step is divided in three steps defined with reference to FIG. 5:

VE inter subband pooling step 1700;

VE/SE interaction step 1710; and

Spatial pooling step 1720.

At step 1700, a directional pooling applies first. To this aim, a visibility map denoted $VE_l$ is first computed for each level l except for the lowest frequency band (corresponding to l=L) according to the following equation:

$$VE_l(m, n) = \max_{d=LH,HL,HH} (VE_{l,d}(m, n))$$

This directional pooling provides L visibility maps. The lowest frequency band is added to this set of visibility maps so that L+1 visibility maps are available. Then, a level pooling applies. The level pooling consists in combining linearly the L+1 visibility maps $VE_l$ into a single visible error map denoted VE. This combination depends of the radial selectivity of HVS. It means that the linear coefficient corresponding to each level l depends on the spatial frequency range of this level. It makes it possible to give more weight to some levels. The four radial frequency channels of the PSD are one low-pass called I with radial selectivity of 1 cy/d° to 1.5 cy/d°, and three band-pass called II, III, IV with radial selectivity of 1.5 cy/d° to 5.7 cy/d°, 5.7 cy/d° to 14.2 cy/d°, 14.2 cy/d° to 28.2 cy/d° respectively. The maximal spatial frequency $f_{max}^l$ of each level l is calculated in function of maximal spatial frequency of the image $F_{max}$:

$$f_{max}^l = \frac{F_{max}}{2^{l+1}}.$$

$$F_{max} = \tan\left(\frac{1}{2}\right) \times \frac{d}{H} \times H_{pixel},$$

where H is the image height in meters, $H_{pixel}$ is the image height in pixel, and d is the distance of visualization in meters.

So, four coefficients $a_I$, $a_{II}$, $a_{III}$ and $a_{IV}$ are used for the level pooling, corresponding to the radial frequency channel I, II, III and IV respectively. The visible error map VE is thus calculated as follows:

$$VE(m, n) = \sum_{l=0}^{L} a(l) \times VE_l(m, n),$$

$$\text{with } a(l) = \begin{cases} a_I & \text{if } \dfrac{F_{max}}{2^{l+1}} \in [0; 1.5](cy/d°) \\ a_{II} & \text{if } \dfrac{F_{max}}{2^{l+1}} \in [1.5; 5.7](cy/d°) \\ a_{III} & \text{if } \dfrac{F_{max}}{2^{l+1}} \in [5.7; 14.2](cy/d°) \\ a_{IV} & \text{if } \dfrac{F_{max}}{2^{l+1}} \geq 14.2(cy/d°) \end{cases}$$

The four coefficients $a_I$, $a_{II}$, $a_{III}$ and $a_{IV}$ makes it possible to give a different weight to each level, and are empirically determined from trial on an image database. At step 1710, a perceptual error map $E_p$ is computed. To this aim, four classes are defined as follows:

Cl$_1$ is the set of sites (m,n) for which $SE^{new}(m,n)=1$;
Cl$_2$ is the set of sites (m,n) for which $SE^{lost}(m,n)=1$;
Cl$_3$ is the set of sites (m,n) for which $SE^{new}(m,n)=1$ or $SE^{lost}(m,n)=1$;
Cl$_4$ is the set of sites (m,n) for which either $SE^{new}(m,n)=0$ and $SE^{lost}(m,n)=0$.

For each class Cl$_i$ a corresponding error map $VE_{Cl_i}$ is computed as follows:
$VE_{Cl_i}(m,n)=VE(m,n)$ if the site (m,n) belongs to the class Cl$_i$ and $VE_{Cl_i}(m,n)=0$ otherwise. Then the perceptual error map $E_p$ is computed using a linear combination of the four error maps $VE_{Cl_i}$ as follows:

$$E_p(mn) = \sum_{i=1}^{4} \alpha_i \cdot VE_{Cl_i}(m,n)$$

The parameters $\alpha_i$ it possible to give a different weight to each class. They are empirically determined from trial on an image database.

At step 1720, a spatial pooling step applies in order to get a global quality score. The global quality score Q is computed from the perceptual error map E with a Minkowski summation as follows:

$$Q = \left(\frac{1}{M \cdot N}\sum_{m=1}^{M}\sum_{n=1}^{N}(E_p(m,n))^{\beta_p}\right)^{\frac{1}{\beta_p}},$$

where M and N are the height and the width of the image respectively and $\beta_p$ is the Minkowski exponent. The value $\beta_p$ is determined on a set of test data. According to a preferred embodiment, $\beta_p$ belongs to the set [1;6]. The objective quality score Q is possibly transformed into predicted Mean Observer Score (MOSp) using a psychometric function. The psychometric function is given by:

$$MOSp = \frac{b1}{1 + e^{-b2 \cdot (Q-b3)}},$$

where b1, b2 and b3 are the three parameters of the psychometric function, which are calculated from MOS and Q scores on an image database.

The range of the objective quality score is between [0; 1[, and the range of the MOSp is between [0; 6[.

The corresponding category rating is the following:
5 is imperceptible;
4 is perceptible but not annoying;
3 is slightly annoying;
2 is annoying;
1 is very annoying.

This method for assessing image quality is advantageously used in an encoding device to compare a reconstructed image with the corresponding source image. This method can be used to compare the performance of different encoding devices (different codec). The perceptual error map computed by this method can be used in an encoding device to locally adapt the decision or the quantification step.

The invention claimed is:

1. A method for assessing image quality between a reference image and an impaired image, each image being associated with at least one luminance component comprising the steps of:
   subband decomposition of the luminance component of the reference image into N subbands, called reference subbands and of the luminance component of the impaired image into N subbands, called impaired subbands;
   errors computation from the reference subbands and from the impaired subbands; and
   pooling the computed errors;
wherein said subband decomposition is based on a wavelet transform adapted to decompose each of said luminance components into L levels of decomposition, and wherein L is determined as the lowest positive integer that verifies the following inequality:

$$\frac{F_{max}}{2^L} < Th, \text{ where: } -F_{max} = \tan\left(\frac{1}{2}\right) \times \frac{d}{H} \times H_{pixel};$$

H is the image height in meters;
$H_{pixel}$ is the image height in pixel;
d is the distance of visualization in meters; and
Th is a predefined threshold.

2. Method according to claim 1, wherein each image being further associated with two chrominance components, the subband decomposition step is preceded by a transformation step for transforming the luminance component and the two chrominance components of a given image into a new luminance component and two new chrominance components lying in an opponent color space.

3. Method according claim 1, wherein the subband decomposition step is followed by a contrast sensitivity function filtering step for filtering the N reference subbands and the N impaired subbands.

4. Method according to claim 3, wherein contrast sensitivity function filtering step is followed by a masking step of the filtered subbands into normalized subbands.

5. Method according to claim 1, wherein the predefined threshold Th equals 1.5.

6. Method according to claim 4, wherein the masking step comprises the following steps:
   computing, for each coefficient of each filtered subband one visibility threshold elevation with respect to the reference image and one visibility threshold elevation with respect to the impaired image, each of said visibility threshold elevation depending on a local complexity parameter;
   computing, for the impaired image and the reference image, the coefficients of the normalized subband as the corresponding coefficient of the filtered subbands divided by the maximum value between the visibility threshold elevation of said coefficient relating to the reference image and the visibility threshold elevation of said coefficient relating to the impaired image.

7. Method according to claim 6, wherein the visibility threshold elevation with respect to a given image is computed for a coefficient $c_{l,d}(m,n)$ of coordinates m and n in a subband of decomposition level l and direction d as follows:

$$T_{l,d}(m,n) = \left|(1 + (k_1 \times (k_2 \times |\tilde{c}_{l,d}(m,n)|)^{S+\Delta s(m,n)})^b)^{\frac{1}{b}}\right|$$

where:
$\tilde{c}_{l,d}(m,n)$ is a normalized coefficient computed from $\tilde{c}_{l,d}(m,n)$;
$k_1 = 0.0153$
$k_2 = 392.5$
$S + \Delta s(m,n) \in [0.6; 1]$
$\Delta s(m,n)$ is the local complexity parameter, $\Delta s(m,n) \in [0; 1-s]$ Subband dependant:
$b \in [2;4]; S \in [0.6; 0.8]$.

8. Method according to claim 1, wherein the subband decomposition step is preceded by a filtering step for filtering the luminance component of the reference image and the luminance component of the impaired image according to a non linear function.

* * * * *